(No Model.)
W. C. SALMON.
STEAM COOKING APPARATUS.
No. 268,732. Patented Dec. 5, 1882.
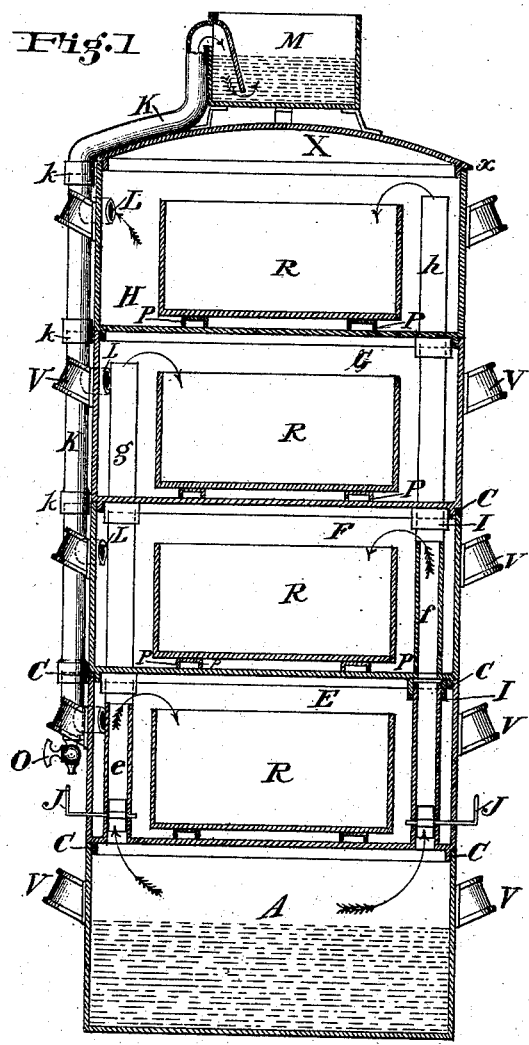
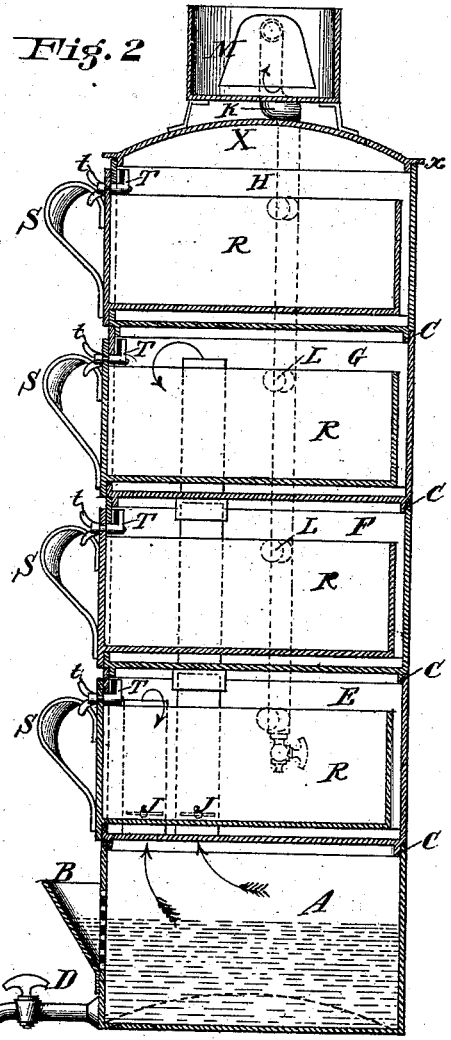
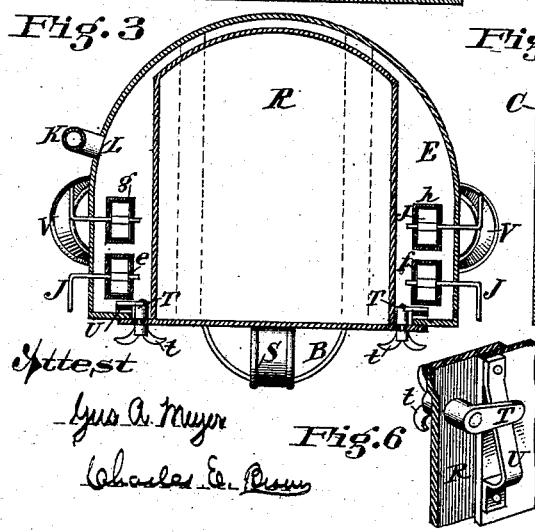
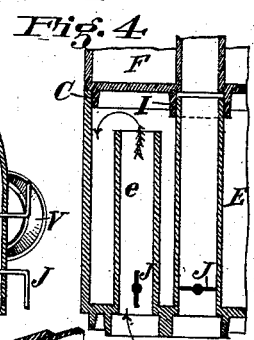
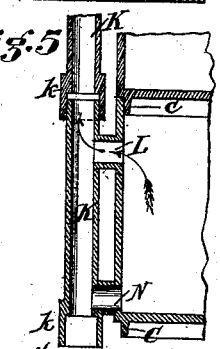

UNITED STATES PATENT OFFICE.

WILLIAM C. SALMON, OF CINCINNATI, OHIO, ASSIGNOR OF ONE-HALF TO HENRY KASSON, OF COVINGTON, KENTUCKY.

STEAM COOKING APPARATUS.

SPECIFICATION forming part of Letters Patent No. 268,732, dated December 5, 1882.

Application filed April 26, 1882. (No model.)

*To all whom it may concern:*

Be it known that I, WILLIAM C. SALMON, a citizen of the United States, residing in Cincinnati, Hamilton county, Ohio, have invented certain new and useful Improvements in Steam Cooking Apparatus, of which the following is a specification.

My improved cooker consists generally of a steam-generating water-chamber connected by pipes and flues with a series of superimposed compartments, so arranged that one or all may be used independent of the others, and into which the steam is admitted for cooking.

The novelty of my invention consists in the construction of combinations of the parts, as will be herewith set forth and specifically claimed.

Figure 1 of the accompanying drawings represents a sectional front view of the cooking device, showing four compartments for cooking. Fig. 2 is a sectional side view of my cooking device, showing the handles to the doors or drawers and the locks or latches for the same. Fig. 3 represents the bottom of the lower compartment, showing the steam-tubes and valves or dampers; Fig. 4, side view of two of the steam flues and valves. Fig. 5 shows a section of the tube for carrying off the steam from the compartments and draining them. Fig. 6 shows inclined bracket and catch for fastening the door of the compartment or the drawer containing the material to be cooked in the chamber.

The lower chamber or compartment, A, is provided with a funnel-shaped opening, B, on its side for pouring water in, and a cock, D, for drawing it off. Above this steam-chamber are arranged in succession any convenient number of compartments, (the drawings showing four, E F G H,) and to each compartment independent tubes *e f g h* convey the steam from the chamber A. The bottom of each compartment is provided with flanges C, which fit close within the top of the compartment below, making a tight joint or connection. They are also provided with flanges or a downward extension of the steam-section of the tubes, which pass through them, as shown at I I, into which fits snugly the upper end of the section of the steam-tube below. By this means any one of the compartments may be lifted off, and the one above it will fit down into its place; and, if desirable, all but one may be removed, or any convenient number used. Each tube is provided with a valve, J, at the bottom, by which the steam may be turned off from one or all the compartments. In addition to the pipes for conveying the steam to the chambers or compartments, there is a pipe, K, extending from the lower compartment to the top, jointed at each compartment, just as the steam-tubes are, as shown at *k k*. This pipe has an opening into each compartment at L L L, through which the surplus steam and vapors arising from the cooking vegetables or meat may pass out, and are conveyed to the top, where the pipe descends into a cup of water, M, on the top of the cooking device. The steam, passing up through this pipe K K, passes down into the vessel M and escapes through the water contained in it, and in passing through the water in the vessel M the odors are absorbed by the water and the steam and vapors escape into the air odorless. With a moderate quantity of water in the vessel M the fresh steam from the boiler, entering all the compartments in use, forces the heated vapors and the steam already in the compartments and in the pipe K up through the pipe K into the water in the vessel M, through which it escapes in the air. Where it is desired to drain the compartments of water produced by the condensed steam, an opening into the pipe K is made at the bottom of each compartment, as shown at *n*, Fig. 5. The pipe K is provided at its lower end with a cock, O. The opening *n* may, if desirable, be used both for the escape of the steam and to drain the compartment, thus dispensing with the upper opening, L. Each compartment is provided with projections P P on its bottom, upon which rest the drawers or vessels containing the material to be cooked, thus permitting the steam to pass beneath and all around the vessel. The compartments may be provided with doors on the sides for introducing a vessel containing the food; or, as shown in the drawings, this door may form part of a drawer, used as a vessel to contain the food, as shown at R R R, with handles S S S, and which slides into the compartment, and is there firmly secured by the latch T, operated from the outside by the handle t. This latch works on an inclined bracket, U, so that by turning the latch firmly the drawer or door may be fastened as tightly as desired.

Each compartment is provided with handles V V V, by which it may be lifted or carried, and each drawer or vessel may be provided with a tight lid, which will prevent the steam coming in contact with the material to be cooked, so that bread may be baked or anything cooked requiring dry heat, and all the juices or essence retained, so that bread baked in this way is richer and sweeter than in an oven. The top X has a flange around its lower edge, which fits snugly within the top of the compartment below it. The bottom of the lower compartment, which contains the water to be heated, may be made flat, as shown in Fig. 1, or concave, so as to retain the heat, as shown by the dotted lines in Fig. 2. This compartment also serves as a tea-kettle, from which hot water may be drawn at any time by the cock D.

The operation is as follows: The boiler A being placed over the fire and steam generated, the valves J J being open, it passes up the tubes e f g h, and, following the line indicated by the arrows, enters the various chambers and heats them with great rapidity, thoroughly cooking whatever may be in them. If the pans or drawers R are covered with a lid, no steam comes in contact with their contents, and bread may be baked or meat roasted and all the juices preserved. If any steam is condensed in the chambers, it is drained off into pipe K through the opening n, Fig. 5. The surplus steam also passes into the pipe through the opening n or L, and is conveyed up and through the water-cup M, where it is deprived of all odors.

Having thus fully described my invention, I claim—

1. In a steam cooking device having a series of cooking compartments, arranged one above the other, and the whole series placed above a boiler, the combination, with each of said compartments, of separate or independent tubes or flues connecting with the boiler and provided with valves or dampers, whereby steam may be admitted into any one of the compartments, and whereby steam in any cooking-compartment is admitted and kept independent of all the others, and a waste-pipe for conveying off the vapors or surplus steam, substantially in the manner and for the purpose described.

2. In combination with the steam cooking device, the pipe K, arranged outside of but so connected with each compartment as to carry off the condensed steam through the cock O and the vapors through the deodorizing-tank M.

3. In a steam cooking device having a series of removable and independent cooking compartments, arranged one above the other and over a boiler, with steam-connections to each of the compartments, the combination, with said cooking-compartments, of a sectional pipe, K, with openings into each compartment passing up into a water-tank, M, with a water-sealed connection, whereby the odor-laden steam and vapors escaping from the compartments are made to pass through the water in the tank M before they are discharged, substantially as and for the purpose specified.

4. In a steam cooking device having separate and independent cooking compartments, each connected with the subjacent boiler, the combination, with the floor of each cooking compartment, provided with raised tracks or ribs, of removable cooking-vessels, each resting upon the tracks or ribs of its compartment, whereby the steam entirely surrounds the cooking-vessels, substantially in the manner described.

WM. C. SALMON.

Witnesses:
WILL W. ADAMS,
B. F. KEFFER.